United States Patent [19]

Mueller et al.

[11] Patent Number: 5,643,984
[45] Date of Patent: Jul. 1, 1997

[54] NEW WAX COMPOSITION FOR THE PRINTING INK INDUSTRY AND INK COMPOSITIONS AND OVERPRINT VARNISHES CONTAINING SAME

[75] Inventors: Raymond J. Mueller, Plymouth; George S. Hassaballa, Ypsilanti, both of Mich.

[73] Assignee: Flint Ink Corporation, Ann Arbor, Mich.

[21] Appl. No.: 582,305

[22] Filed: Jan. 3, 1996

[51] Int. Cl.$^6$ ............... C08L 93/04; C08L 91/06; C09D 191/06; C09D 193/04

[52] U.S. Cl. ............ 524/272; 126/224; 126/271; 126/2; 524/35; 524/270; 524/275; 524/277; 524/478; 524/487; 524/488; 524/489; 106/201.1

[58] Field of Search ............... 524/270, 272, 524/275, 277, 487, 488, 489, 35, 478; 106/201, 224, 271

[56] References Cited

U.S. PATENT DOCUMENTS

| | | | |
|---|---|---|---|
| 3,162,611 | 12/1964 | Varron et al. | 524/487 |
| 3,413,250 | 11/1968 | Varron et al. | 524/272 |
| 4,060,569 | 11/1977 | Woods et al. | 526/348.3 |
| 4,224,204 | 9/1980 | Nichols et al. | 524/277 |
| 4,299,644 | 11/1981 | Arnold | 427/411 |
| 4,633,001 | 12/1986 | Cells | 556/44 |
| 4,659,383 | 4/1987 | Lin et al. | 523/160 |
| 4,839,224 | 6/1989 | Chou et al. | 428/323 |
| 5,182,572 | 1/1993 | Merritt et al. | 347/88 |
| 5,312,683 | 5/1994 | Chou et al. | 428/323 |

FOREIGN PATENT DOCUMENTS 0021169  1/1986  Japan ................. 524/487

*Primary Examiner*—Peter A. Szekely
*Attorney, Agent, or Firm*—Dinnin & Dunn, P.C.

[57] ABSTRACT

A new wax composition for use in the ink industry, which composition is prepared from: (a) 40% to 90% of solvent having a boiling point within the range of about 100° to 550° C., said solvent being selected from the group consisting of aromatic and aliphatic solvents, (b) 10% to 40% of wax having an average particle size within the range of about 1 to about 300 microns, (c) 5% to 40% of polymeric pour point depressant, and optionally dependant on the characteristics required, 4% to 40% of a resin material which is soluble in aromatic and aliphatic solvents.

20 Claims, No Drawings

NEW WAX COMPOSITION FOR THE PRINTING INK INDUSTRY AND INK COMPOSITIONS AND OVERPRINT VARNISHES CONTAINING SAME

BACKGROUND OF THE INVENTION

This invention broadly relates to new and improved wax compositions for use in the ink industry.

Wax compounds of a wide variety have been used in publication gravure inks, and in the ink industry as a whole, to improve and enhance the slip and scuff resistance properties of ink films. The prior wax compounds or compositions have encompassed a wide range of wax chemical compositions from paraffins to microcrystallines, to high density polyethylenes, and even to Teflon® containing products. The prior state of the art has been either to: (a) disperse micronized waxes into a suitable vehicle system, or (b) to dissolve certain waxes in a solvent and/or solvent-resin combination; and, then to precipitate the wax under controlled cooling conditions to achieve the desired properties.

These prior wax compositions have been used with a certain amount of success for many years in the past, however, there have been numerous drawbacks associated with those prior compositions. For example, they may enhance the rub characteristics but do not eliminate scuffing damage. They also have a tendency to reduce the gloss of printed films and can cause printability problems due to poor trapping characteristics of one wax film over another. Additionally, the prior, wax compositions tend to be temperature sensitive and under various storage and handling conditions can change wax particle size, and therefore, they are rendered less effective for rub or scuff resistance.

Accordingly, a primary object of the present invention is to provide a new and improved wax composition for use in the ink industry which provides technically advanced properties of rub resistance and scuff resistance which results are obtained with minimal effect on the gloss characteristics.

Another object of the present invention is to provide a new and improved wax composition for use in the publication gravure ink industry.

Another object of the present invention is to provide a new wax composition for use in the ink industry which has minimal effect on the gloss and trap characteristics during usage in the printing process.

Another object of the present invention is to provide a new wax composition for use in the ink industry which may be incorporated directly into the press ready ink, or which may be incorporated into the virgin ink at the time of manufacture, or which can be incorporated into overprint varnishes used subsequently to give maximum protection to the printed materials.

Other objects, features, and advantages of the present invention will become apparent from the subsequent description and the appended claims.

SUMMARY OF THE INVENTION

The present invention is a unique modification of wax technology for the ink industry in that it has been discovered that by incorporating a pour point depressant (e.g., of the type formerly used by the petroleum industry) it is possible to provide a technically advanced and heretofore unknown formulation for use in the ink industry. This new formulation provides unique properties that include outstanding rub characteristics significantly better than the best compounds previously available on the market. In addition, usage of the new composition, discovered and disclosed herein, provides minimal effect on gloss and trap characteristics, as well as excellent product stability under a wide range of storage conditions, and excellent handling characteristics. The composition disclosed herein is particularly useful in the publication gravure ink industry. The compositions discovered herein may also be incorporated directly into the press ready ink, or they can be incorporated into the virgin ink at the time of manufacture, or they can be incorporated into overprint varnishes.

Briefly stated, the present invention comprises a composition for use in the ink industry to improve and enhance the slip and scuff resistant properties of ink films, said composition comprising, in weight percent: (a) about 40% to about 90% of solvent having a boiling point within the range of about 100° C. to about 550° C., said solvent being selected from the group consisting of aromatic and aliphatic solvents, (b) about 10% to about 40% of wax having an average particle size within the range of about 1 to about 300 microns, (c) about 5% to about 40% of polymeric pour point depressant, (d) about 4% to about 40% of a resin material which is soluble in aromatic and aliphatic solvents.

In another aspect, briefly stated, the present invention comprises a composition for use in the ink industry to improve and enhance the slip and scuff resistant properties of ink films, said composition comprising, in weight percent: (a) about 40% to about 90% of solvent having a boiling point within the range of about 100° C. to about 550° C., said solvent being selected from the group consisting of aromatic and aliphatic solvents, (b) about 10% to about 40% of wax having an average particle size within the range of about 1 to about 300 microns, (c) about 5% to about 40% of polymeric pour point depressant.

DESCRIPTION OF THE BEST MODE OF CARRYING OUT THE INVENTION AND OF THE PREFERRED EMBODIMENTS

The solvent used in the inventive compositions should typically be a hydrocarbon solvent or other suitable solvent as described herein. The boiling point range for the solvent material used should typically be within the range of about 100° C.–200° C. for gravure ink applications; and, about 200°–550° C. for offset printing ink applications. Typical solvents which may be used are toluene; reclaimed (or recovered) solvent [92% toluene, and the balance of xylene and other aliphatic solvents]; or a solvent such as 50% toluene and 50% aliphatic solvent. The amount of solvent used should, broadly stated, be within the range of approximately 40% to about 90% by weight of the composition and preferably about 50% to about 70% by weight of the composition, with best results being obtained within the range of about 55% to about 65% by weight of the composition.

The wax material used in the composition of the invention should typically be a hydrocarbon wax or other wax as described herein. Typical examples are polyethylene waxes, microcrystalline hydrocarbon waxes, Fischer-Tropsch waxes, oxidized polyethylene waxes, and/or carnauba wax. The wax should typically have a melting point within the range of about 100° F. to about 260° F. The average particle size of the wax used should be, broadly stated, within the range of about 1 micron to about 300 microns; and preferably, within the range of about 2 microns to about 150 microns average particle size. The amount of wax used should, broadly stated, be within the range of about 10% to about 40% by weight of the composition, and preferably within the range of about 15% to about 30% by weight of said composition. Best results are obtained when the amount of wax is within the range of about 17% to about 25% by weight of the composition.

The pour point depressant used in the composition of the invention is a polymeric material and, broadly stated, should be present within the range of about 5% to about 40% by weight of the composition. Preferably it should be present within the range of about 15% to about 30% by weight of the composition, and best results have been obtained when the pour point depressant is used within the range of about 16% to about 28% by weight of the composition. The useable polymeric pour point depressants are selected from at least one member of the group consisting of a polymethacrylate polymer; a polyacrylate polymer; a polyacrylamide polymer; condensation products of haloparaffin waxes and aromatic compounds; a vinyl carboxylate polymer; and terpolymers of dialkylfumarates, vinyl esters of fatty acids, and alkyl vinyl ethers. Such pour point depressants are described in U.S. Pat. Nos. 4,824,611; 2,387,501; 2,015,748; 2,655,479; 1,815,022; 2,191,498; 2,666,746; 2,721,877; 2,721,878; and 3,250,715, which patents are incorporated herein by reference. The preferred pour point depressants for use in the invention are available from Rohm & Haas company and are identified as Acryloid 144-50, Acryloid JR-3215, Acryloid AC-156, Acryloid 954, Acryloid AC-1019, and Acryloid AC-150, and are known as acrylic polymeric pour point depressants.

In accordance with the invention, two general types of compositions may be used, and with regard to the usage of these compositions they are normally added into the press ready ink, or into the virgin ink at the time of manufacture.

The resin material used in the composition, described in terms of resin solids, should be present within the broad range of about 4% to about 40% by weight of the composition, and preferably within the range of about 8% to about 20%; and, best results are obtained when the resin is present from about 10% to about 15% by weight of the composition. The resin material is a separate and a distinct material relative to said pour point depressant and the resin material is selected from at least one member of the group consisting of a metal resinate, phenolic modified rosin, phenolic resin, hydrocarbon resin, hydrocarbon modified rosins, an acrylic resin, a polyamide resin, a maleic modified rosin, a fumaric modified rosin and a cellulosic resin. The resin material should be soluble in aromatic and aliphatic solvents.

Various other additive materials may also be included in the composition within the range of about 0.001% to about 7% by weight of the composition. The additive materials are selected from at least one member of the group consisting of a defoamer, a dispersing agent, an antioxidant, a UV (ultraviolet) absorber, a flow agent, a gloss enhancer, a surfactant, a rheology modifier, and an anti-settling agent.

In a gravure ink composition, or in other ink compositions, the compositions described above can be incorporated into the ink compositions at a level of about ¼% to about 40% by weight, and preferably from about ½% to about 25% by weight; with best results being obtained at about ½% to about 15% by weight.

In order to further illustrate the invention, the following examples are provided. It is be understood, however, that the examples are included for illustrative purposes and are not intended to be limiting of the scope of the invention as set forth in the subjoined claims.

| | pbw (parts by weight) | |
|---|---|---|
| Example 1 | | |
| Toluene | 44.700 | |
| 4500 UFP Ultrafine (wax) (Royce Co.) | 4.000 | (M.P. 225° F.; Avg. part. size N5*) [approx. 5 microns] |
| Acryloid 144-50 (pour point depressant) | 3.300 | |
| GT-4780 35 Phenolic Resin | 48.000 | |
| | 100.000 | [*NPIRI std. gage] |
| Example 2 | | |
| Toluene | 69.500 | |
| 00 UFP Ultrafine | 30.000 | |
| Acryloid 144-50 | .500 | |
| | 100.000 | |
| Example 3 | | |
| Toluene | 40.000 | |
| Acryloid 144-50 | 15.000 | |
| 4511 UFP Ultrafine (wax) (Royce Co.) | 15.000 | (M.P. 243° F.; Avg. part. size: 5 microns) |
| Toluene | 30.000 | |
| | 100.000 | |
| Example 4 [Red Gravure Printing Ink;] | | |
| Metal Resinate soln. | 49.524 | |
| Recovered Solvent | 20.937 | |
| Metal Resinate soln. | 15.943 | |
| Ba Lithol PR 49:1 | 9.600 | |
| Toluene | 1.190 | |
| Phenolic Resin Solution | .714 | |
| Polyethylene Wax | .714 | (softening point 240° F.; Avg. part. size: 12 microns) |
| Acryloid 144-50 | .476 | |
| Phenolic Modified Rosin | .476 | |
| Dispersing Agent | .377 | |
| Wetting Agent/Defoamer | .048 | |
| | 100.000 | |
| Example 4A | | |
| Toulene | 15.000 | |
| TBW-25388 Wax | 50.000 | (Flint Ink Corp./ Polyethylene Wax) |
| Acryloid 144-50 | 10.000 | |
| Phenolic Modified Rosin | 20.000 | |
| Toluene | 5.000 | |
| | 100.000 | |
| Example 5 [Red Gravure Printing Ink] | | |
| Metal Resinate soln. | 48.598 | |
| Recovered Solvent | 21.013 | |
| Metal Resinate soln. | 15.645 | |
| Ba Lithol PR 49:1 | 9.421 | |
| Toluene | 1.636 | |
| Phenolic Solution | .981 | |
| Polyethylene Wax | .981 | (softening point 240° F.; Avg. part. size: 12 microns) |
| Acryloid 144-50 | .654 | |
| Phenolic Modified Rosin | .654 | |
| Dispersing Agent | .370 | |
| Wetting Agent/Defoamer | .047 | |
| | 100.000 | |

Example 6 [Red Gravure Printing Ink]

| Component | pbw (parts by weight) | |
|---|---|---|
| Metal Resinate soln. | 47.273 | |
| Recovered Solvent | 21.122 | |
| Metal Resinate soln. | 15.218 | |
| Ba Lithol PR 49:1 | 9.164 | |
| Toluene | 2.273 | |
| Phenolic Resin Sol'n | 1.364 | |
| Polyethylene Wax | 1.364 | (softening point 240° F.; Avg. part. size: 12 microns) |
| Acryloid 144-50 | .909 | |
| Phenolic Modified Rosin | .909 | |
| Dispersing Agent | .360 | |
| Wetting Agent/Defoamer | .045 | |
| | 100.000 | |

Overprint Varnish Formulations (Examples 7–12)

Example 7

| Component | pbw |
|---|---|
| Toluene | 25.000 |
| Acryloid 144-50 | 5.000 |
| Wax (2169-32A) | 5.000 |
| Wetting Agent | 0.050 |
| Phenolic Resin Soln. | 40.000 |
| Toluene | 24.950 |
| | 100.000 |

Example 7A (Formula 2169-32A)

| Component | pbw | |
|---|---|---|
| Toluene | 69.500 | |
| Polyethylene Wax | 30.000 | (M.P. 250° F.; avg. part. size: 5 microns) |
| Acryloid 144-50 | 0.500 | (pour point depressant) |
| | 100.000 | |

Example 8

| Component | pbw |
|---|---|
| Toluene | 25.000 |
| Acryloid 144-50 | 5.000 |
| Wax (2169-32A) | 5.000 |
| Wetting Agent/Defoamer | 0.050 |
| Phenolic Resin soln. | 40.000 |
| Toluene | 24.950 |
| | 100.000 |

Example 9

| Component | pbw |
|---|---|
| Toluene | 25.000 |
| Acryloid 144-50 | 5.000 |
| Polyethylene Wax (Flint TBW-25388) | 5.000 |
| Phenolic Resin soln. | 40.000 |
| Toluene | 24.950 |
| Wetting Agent/Defoamer | .050 |
| | 100.000 |

Example 10

| Component | pbw |
|---|---|
| Toluene | 24.700 |
| Acryloid 144-50 | 3.300 |
| 4511-UFP Ultrafine Wax | 4.000 |
| Wetting Agent/Defoamer | 0.050 |
| Phenolic Resin Solution | 47.950 |
| Toluene | 20.000 |
| | 100.000 |

Example 11

| Component | pbw | |
|---|---|---|
| Toluene | 24.700 | |
| Acryloid JR-3215 | 3.300 | (pour point depressant) |
| Hi-Melt Polyethylene Wax | 4.000 | (M.P. 245° F.; avg. part. size: 5 microns) |
| Wetting Agent/Defoamer | 0.050 | |
| Phenolic Resin Solution | 47.950 | |
| Metal Resinate soln. | 5.000 | |
| Toluene | 20.000 | |
| | 100.000 | |

Example 12

| Component | pbw |
|---|---|
| Toluene | 39.700 |
| Acryloid 144-50 | 3.300 |
| TBW-25388 Wax | 3.000 |
| 4511-UFP Ultrafine Wax | 4.000 |
| Wetting Agent/Defoamer | 0.050 |
| Phenolic Resin Solution | 39.950 |
| Metal Resinate soln. | 5.000 |
| Toluene | 5.000 |
| | 100.000 |

Example 13

| Component | pbw | |
|---|---|---|
| Toluene | 69.500 | |
| Polyethylene Wax | 30.000 | (M.P. 250° F.; avg. part. size: 5 microns) |
| Acryloid AC-156 | 0.500 | (pour point depressant) |
| | 100.000 | |

Example 14

| Component | pbw | |
|---|---|---|
| Toluene | 69.500 | |
| Polyethylene Wax | 30.000 | (M.P. 250° F.; avg. part. size: 5 microns) |
| Acryloid 144-50 | 0.500 | (pour point depressant) |
| | 100.000 | |

Example 15

| Component | pbw |
|---|---|
| Toluene | 69.500 |
| 4511-UFP Ultrafine Wax | 30.000 |
| Acryloid 144-50 | 0.500 |
| | 100.000 |

Example 16

| Component | pbw |
|---|---|
| Toluene | 40.000 |
| 4511-UFP Ultrafine Wax | 15.000 |
| Acryloid 144-50 | 15.000 |
| Toluene | 30.000 |
| | 100.000 |

Example 17

| Component | pbw |
|---|---|
| Toluene | 20.000 |
| TBW-25388 Wax | 50.000 |
| Acryloid 144-50 | 10.000 |
| Phenolic Resin Soln. | 15.000 |
| Toluene | 5.000 |
| | 100.000 |

Example 18

| Component | pbw |
|---|---|
| Toluene | 15.000 |
| TBW-25388 Wax | 50.000 |
| Acryloid 144-50 | 10.000 |
| Phenolic Resin Soln. | 20.000 |
| Toluene | 5.000 |
| | 100.000 |

The above disclosed products and compositions have been found to produce unique results, particularly in publication gravure printing ink processes, for purposes of preventing damage and scuffing on magazine covers during shipping. The compositions have also been tested and shown to give excellent properties that include outstanding rub resistance characteristics significantly better than the best compounds previously on the market. The compositions disclosed also exhibit minimal effect on gloss and trap characteristics, excellent stability under a wide range of storage conditions, and excellent handling characteristics. The compositions disclosed are also low enough in viscosity such that they can be poured into the ink fountains and mixed readily with press ready ink.

While it will be apparent that preferred embodiments of the invention disclosed are well calculated to fulfill the objects, benefits, or advantages of the invention, it will be appreciated that the invention is susceptible to modification, variation and change without departing from the proper scope or fair meaning of the subjoined claims.

What is claimed is:

1. A composition for use in the ink industry to improve and enhance the slip and scuff resistant properties of ink films, said composition comprising, in weight percent:
   (a) about 40% to about 90% of solvent having a boiling point within the range of 100° C. to about 550° C., said solvent being selected from the group consisting of aromatic and aliphatic solvents,
   (b) about 10% to about 40% of wax having an average particle size within the range of about 1 to about 300 microns, and said wax is selected from the group consisting of polyethylene waxes, microcrystalline waxes, Fischer-Tropsch waxes, oxidized polyethylene waxes, and carnauba wax,
   (c) about 5% to about 40% of polymeric pour point depressant and said polymeric pour point depressant is selected from at least one member of the group consisting of a polymethacrylate polymer; a polyacrylate polymer; a polyacrylamide polymer; a vinyl carboxylate polymer; and terpolymers of dialkylfumarates, vinyl esters of fatty acids, and alkyl vinyl ethers,
   (d) about 4% to about 40% of a resin material which is soluble in aromatic and aliphatic solvents,
and said resin material is a separate and distinct material relative to said pour point depressant and is selected from at least one member of the group consisting of a metal resinate, phenolic modified rosin, phenolic resin, hydrocarbon resin, hydrocarbon modified rosins, an acrylic resin, a polyamide resin, a maleic modified rosin, a fumaric modified rosin, and a cellulosic resin.

2. The composition of claim 1 wherein,
said wax has a melting point within the range of about 100° F. to about 260° F.

3. The composition of claim 1 wherein,
(a) said solvent is present from about 50% to about 70%,
(b) said wax is present from about 15% to about 30%,
(c) said pour point depressant is present from about 15% to about 30%,
(d) said resin material is present from about 8% to about 20%.

4. The composition of claim 1 wherein,
(a) said solvent is present from about 55 % to about 65 %,
(b) said wax is present from about 17% to about 25%,
(c) said pour point depressant is present from about 16% to about 28%,
(d) said resin material is present from about 10% to about 15%.

5. The composition of claim 1 wherein,
an additive material is also included in an amount of about 0.001% to about 7% by weight,
said additive material being selected from at least one member of the group consisting of a defoamer, a dispersing agent, an antioxidant, a UV absorber, a flow agent, a gloss enhancer, a surfactant, a rheology modifier, and an anti-settling agent.

6. A gravure ink composition containing about ½% to about 25% by weight of the composition of claim 1.

7. A gravure ink composition containing about ½% to about 25% by weight of the composition of claim 3.

8. A gravure ink composition containing about ½% to about 25% by weight of the composition of claim 5.

9. An ink composition containing about ¼% to about 40% by weight of the composition of claim 5.

10. A composition for use in the ink industry to improve and enhance the slip and scuff resistant properties of ink films, said composition comprising, in weight percent:
   (a) about 40% to about 90% of solvent having a boiling point within the range of about 100° C. to about 550° C., said solvent being selected from the group consisting of aromatic and aliphatic solvents,
   (b) about 10% to about 40% of wax having an average particle size within the range of about 1 to about 300 microns,
   (c) about 5% to about 40% of polyneric pour point depressant, and
said polymeric pour point depressant is selected from at least one member of the group consisting of a polymethacrylate polymer; a polyacrylate polymer; a polyacrylamide polymer; a vinyl carboxylate polymer; and terpolymers of dialkylfumarates, vinyl esters of fatty acids, and alkyl vinyl ethers.

11. The composition of claim 10 wherein,
said wax has a melting point within the range of about 100° F. to about 260° F.

12. The composition of claim 11 wherein,
said wax is selected from the group consisting of polyethylene waxes, microcrystalline waxes, Fischer-Tropsch waxes, oxidized polyethylene waxes, or carnauba wax.

13. The composition of claim 11 wherein,
(a) said solvent is present from about 50% to about 70%,
(b) said wax is present from about 15% to about 30%,
(c) said pour point depressant is present from about 15% to about 30%.

14. An ink composition containing about ½% to about 25% by weight of the composition of claim 8.

15. A gravure ink composition coating about ½% to about 25% by weight of the composition of claim 10.

16. An overprint varnish composition containing about ½% to about 25% by weight of the composition of claim 1.

17. An overprint varnish composition containing about ½% to about 25% by weight of the composition of claim 3.

18. An overprint varnish composition containing about ½% to about 25% by weight of the composition of claim 11.

19. A composition for use in the ink industry to improve and enhance the slip and scuff resistant properties of ink films, said composition comprising, in weight percent:
   (a) about 40% to about 90% of solvent having a boiling point within the range of about 100° C. to about 550° C., said solvent being selected from the group consisting of aromatic and aliphatic solvents,
   (b) about 10% to about 40% of wax having an average particle size within the range of about 1 to about 300 microns, and said wax is selected from the group consisting of polyethylene waxes, microcrystalline waxes, Fischer-Tropsch waxes, oxidized polyethylene waxes, and carnauba wax, (c) about 5% to about 40% of pour point depressant and said pour point depressant is a condensation product of haloparaffin waxes and aromatic compounds, and (d) about 4% to about 40% of a resin material which is soluble in aromatic and aliphatic solvents.

and said resin material is a separate and distinct material relative to said pour point depressant and is selected from at least one member of the group consisting of a metal resinate, phenolic modified rosin, phenolic resin, hydrocarbon resin, hydrocarbon modified rosins, an acrylic resin, a polyamide resin, a maleic modified rosin, a fumaric modified rosin, and a cellulosic resin.

20. A composition for use in the ink industry to improve and enhance the slip and scuff resistant properties of ink films, said composition comprising, in weight percent:

(a) about 40% to about 90% solvent having a boiling point within the range of about 100° C. to about 550° C., said solvent being selected from the group consisting of aromatic and aliphatic solvents, (b) about 10% to about 40% of wax having an average particle size within the range of about 1 to about 300 microns, (c) about 5% to about 40% of pour point depressant and said pour point depressant is a condensation product of haloparaffin waxes and aromatic compounds.

* * * * *

UNITED STATES PATENT AND TRADEMARK OFFICE
CERTIFICATE OF CORRECTION

PATENT NO. : 5,643,984
DATED : July 1, 1997
INVENTOR(S) : Raymond J. Mueller and George S. Hassaballa It is certified that error appears in the above-identified patent and that said Letters Patent is hereby corrected as shown below:

Column 4, line 16, "00 UFP" should read -- 4500 UFP --;
Column 4, line 44, "Toulene" should read -- Toluene --;*
Column 7, claim 1, line 5, after "of" insert -- about --.

Signed and Sealed this

Ninth Day of December, 1997

Attest:

BRUCE LEHMAN

Attesting Officer

Commissioner of Patents and Trademarks